United States Patent [19] [11] Patent Number: 5,781,972
Steed [45] Date of Patent: Jul. 21, 1998

[54] FISHING SNAP

[76] Inventor: John David Steed, 6365 69th St., Vero Beach, Fla. 32967

[21] Appl. No.: 668,771

[22] Filed: Jun. 24, 1996

[51] Int. Cl.$^6$ .............................. A01K 91/00; A44B 13/00
[52] U.S. Cl. ........................ 24/908; 24/131 C; 24/573.1; 43/44.83
[58] Field of Search ................................... 24/908, 573.1, 24/599.6, 607, 131 C; 43/44.83, 42.49

[56] References Cited

U.S. PATENT DOCUMENTS

| 745,131 | 11/1903 | Abbath | 24/908 |
|---|---|---|---|
| 1,728,560 | 9/1929 | Goshorn | |
| 1,875,274 | 8/1932 | Soule | |
| 2,135,771 | 11/1938 | Roof | |
| 2,371,295 | 3/1945 | Hopkins | 24/908 |
| 3,335,472 | 8/1967 | Imai | |
| 3,750,240 | 8/1973 | Fridrich | 24/237 |
| 4,234,998 | 11/1980 | McMickle | 24/73 |
| 4,696,120 | 9/1987 | Schroeder | 43/44.83 |
| 5,113,616 | 5/1992 | McManus | 43/44.83 |

Primary Examiner—Victor N. Sakran

[57] ABSTRACT

A snap to be utilized with fishing tackle or for other purposes which is made of a singular wire which is bent at a focal region so as to define a first end and a second end. The first end has a bracing arm which integrally connects to an eye region, angularly offset from the bracing arm, shaving a radial portion connected to relatively straight brace and locking regions. The brace region of the eye is integrally connected to three loops which wrap around the bracing arm. The second end is provided with a lever arm and a latching hook with the latching hook being angularly and laterally offset from the lever arm. The latching hook is formed by an upward region and a downward locking region. In a closed position, the latching hook is placed over the brace region of the eye such that an end point of the locking region of the latching hook curves and extends laterally inward away from a plane which defines the locking region of the eye so as to form a durable and secure locking mechanism.

6 Claims, 2 Drawing Sheets

FISHING SNAP

FIELD OF THE INVENTION

The present invention generally relates to snaps and more particularly to fishing snaps, although the invention is not limited to fishing purposes.

BACKGROUND OF THE INVENTION

The prior art demonstrates a number of snap devices for fishing. One problem with the prior art has been that the securing mechanism on the snaps has been subject to failure when the device is stressed. Another problem has been a propensity of the devices to snag which problem of snagging is often caused by the securing mechanism of the snap.

Accordingly, the present invention introduces a durable, economic and dependable snap which is not prone to snagging.

SUMMARY OF THE INVENTION

Accordingly, one object of the present invention is to provide a snap, made of a singular wire, which is durable and economical.

Yet another object of the present invention is to provide a snap which is dependable when subjected to a load, which is not prone to snagging, and which will not accidentally open.

These and other valuable objects and advantages of the present invention are provided by a snap comprised of a single length of tensile wire which is bent at a focal region so as to define a first end region and a second end region.

The first end region is comprised of a bracing arm, an eye and a plurality of loops at the extreme end portion of said first end region, said plurality of loops extending from said eye and looping around said bracing arm;

The second end is comprised of a lever arm and a latching hook located at the extreme end of said second end.

The eye is comprised of a contact brace region which integrally connects to a radial portion of the eye, the radial portion of the eye being integrally connected to a locking region of the eye with the locking region integrally connecting to the plurality of loops which wrap around the bracing arm.

The latching hook is formed by an upward region, which integrally and laterally connects to said lever arm, and by a downward locking region having an end point which extends backward toward said upward region.

When the snap is in an open position, the latching hook and the eye do not make contact. In the open position, the upward region of the latching hook is directed toward the eye with the downward locking region of the latching hook and the end point being directed away from the eye.

When the snap is in a closed position, a contact point of the latching hook makes contact with the contact brace region of the eye with the downward locking region at first being substantially parallel to the locking region of the eye and then curving such that an end point H is positioned inwardly and laterally from a plane which defines the locking region of the eye such that a frontal view of the snap shows that the end point of the latching hook is positioned between the locking region of the eye and the radial portion of said eye.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

THE DETAILED DESCRIPTION OF THE INVENTION

Figure 1:
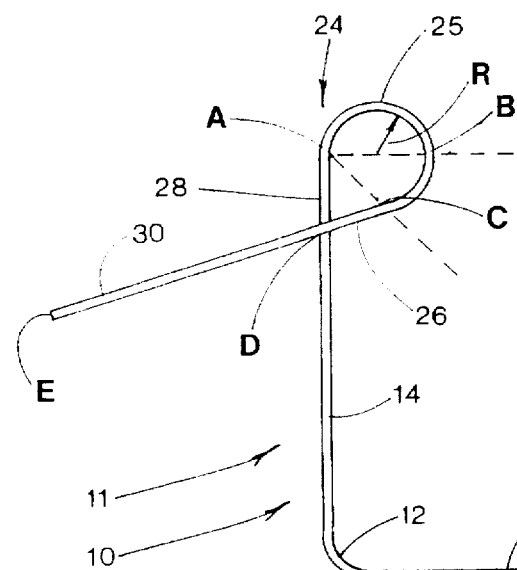
FIG. 1 is a side-view illustration of fishing snap of the present invention during a stage in its manufacture.

With reference to FIG. 1, the fishing snap 10 of the present invention is shown in an unfinished stage of manufacture.

The fishing snap 10 is made of a single piece of stainless steel wire or material having similar resilient properties. Experience has demonstrated that 308 stainless steel wire is a most suitable material. The wire size can be varied depending on the amount of load the snap is likely to be subjected to. The wire sizes the present invention has been made from include 0.028, 0.035, 0.043, 0.052, and 0.062 wire. However, other sizes of wire can be utilized according to the present invention.

The fishing snap 10 has a first end region 11 and a second end region 13 with a focal region 12 being an area of demarcation between the first and second end regions.

The first end region is comprised of a bracing arm 14, eye 24 which is angularly offset from bracing arm 14, and a loop region 30.

The eye is comprised of a contact brace region 28 which is straight and extends from point A to D and is integrally connected to the bracing arm 14.

At point A (FIG. 1), the radial portion 25 of the eye begins and extends through points B and C. The radial portion is of radius R with the radial distance from point A to point B being some 225 degrees. The angle made by points D, A and C, i.e., angle DAC would approximate 45 degrees or somewhat greater than 45 degrees. The locking region 26 of the eye 24 is straight and extends from point C to point A.

Integral to the locking region 26 is loop region 30 which extends from point D to point E and traverses bracing arm 14.

The second end region 13 is comprised of a lever arm 16 which is integrally connected to an upward region 20 of a latching hook 18. The upward region 20 meets the lever arm at a hook bend 17 which is a zero radius bend.

At the stage of assembly shown in FIG. 1, the bracing arm 14 is substantially at a right angle to lever arm 16. Focal region 12 is bent with a radius bend which is equivalent to radius R. Point K which is a contact point of the latching hook 18 (FIG. 3) is in a region of the latching hook which has a radial bend of some 75% of radius R.

Figure 2:
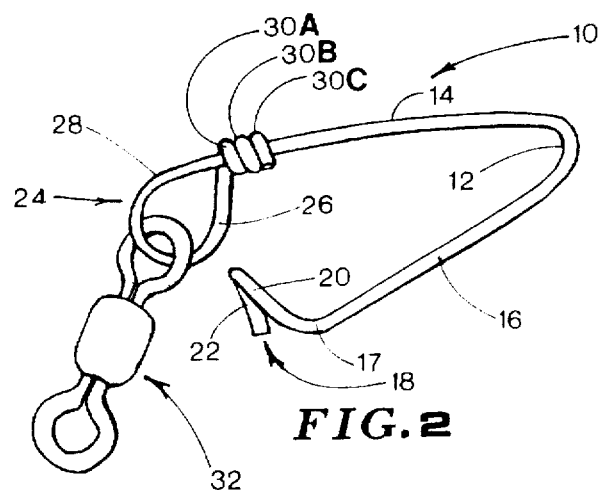
FIG. 2 is a side-view of the fishing snap of the present invention in an open position.

In FIG. 2 a fully completed fishing snap 10 according to the present invention is equipped with a swivel 32 which is connected to eye 24. In its completed state, the loop region 30 has been wound around the bracing arm 14 so as to form a first loop 30A, a second loop 30B and a third loop 30C. Any excess length of the loop region 30 has been cut away so only three snug loops 30A, 30B and 30C are present on the snap.

FIG. 2 demonstrates the fishing snap 10 in an open position with the lever arm 16 appearing in a rest position. The downward locking region 22 is demonstrated as being angularly offset to upward region 20 of latch hook 18.

Figure 3:
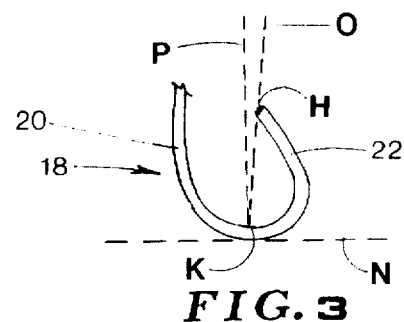
FIG. 3 is a frontal or end closeup view of the latch hook of the fishing snap of the present invention which demonstrates the angular and spatial relationship of the end point h with contact point K and perpendicular line P.

With reference to FIG. 3 the latching hook's upward region 20 meets the downward locking region at point K which represents a contact point. Perpendicular line P intersects point K and normal line N. Line O which intersects end point H of the latching hook and contact point K is approximately two degrees away from line P.

Figure 4:
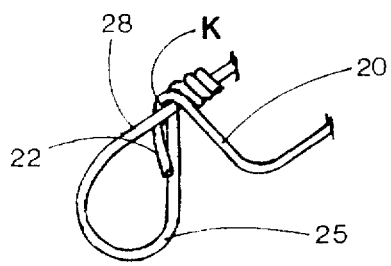
FIG. 4 is a perspective frontal illustration of the present invention in the closed position which demonstrates how the downward locking region of the latching hook is positioned in relation to the locking and radial regions of the eye.

In FIG. 4 the fishing snap is in the closed position with the latching hook 18 extending over the brace region 28. The upward region of the latching hook extends upward and laterally from lever arm 16 to enable point K to come into contact with brace region 28.

In the closed position the downward locking region 22 of the latching hook 18 extends from point K and bends initially so as to be substantially parallel to locking region 26 of the eye. However, as the downward locking region extends downward it extends over the locking region 26 such that when seen from the front the end point H is positioned between the locking region 26 and the radial region 25 (FIG. 5).

Figure 5:
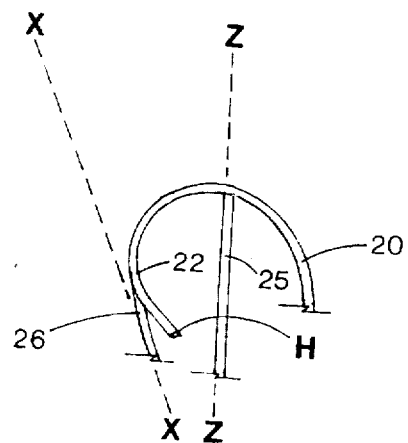
FIG. 5 is a top portion, frontal view of the invention in the closed position.

In FIG. 5, plane X—X extends out of the page and defines a portion of locking region 26. Plane Z—Z extends out of the page and defines radial portion 25 of the eye and bracing arm 14. The snap being in a closed position, end point H is positioned between plane X—X and plane Z—Z.

Figure 6:
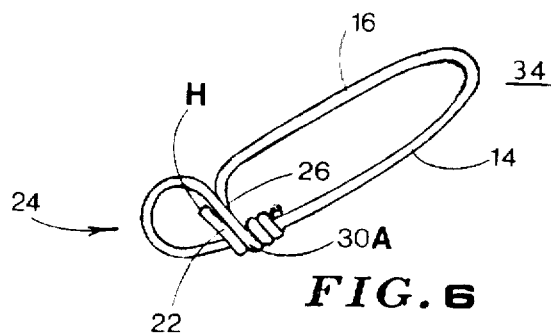
FIG. 6 is a side-view top illustration of the present invention.

In FIG. 6 the fishing snap is in the closed position and lying upon a flat surface 34 such that the lever arm 16 is contacting the flat surface and the eye 24 of the snap does not contact the flat surface. The downward locking region 22 of the latching hook appears substantially parallel to locking region 26 with the end point H extending below the locking region and pointing toward the flat surface.

Figure 7:
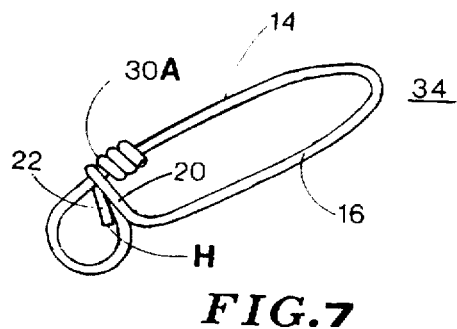
FIG. 7 is a side-view bottom illustration of the present invention.

In FIG. 7 the fishing snap is in the closed position and lying upon a flat surface 34 such that the bracing arm 14 and eye 24 contact the flat surface and the lever arm extends above the flat surface. End point H of the downward locking region of the latching hook points outward from the flat surface and extends above locking region 26.

The lever arm 16 of the fishing snap when it is in the closed position seeks to be in its rest state such that a tight contact is made between the contact point K of the latching hook and the contact brace region 28 of the eye 24.

Furthermore, in the closed position the upward region of the latching hook 18 is substantially parallel to the first loop 30A (FIG. 7) and the downward locking region 22 is initially substantially parallel to the locking region 26 of the eye, but the end point H of the latching hook extends over and beyond the locking region 26 of the eye.

The design of the device makes it able to withstand loads and stresses without the device failing. The downward locking region of the latching hook and the locking region of the eye are designed to prevent the snap from opening even when subjected to a substantial load. Furthermore, the way the end of the latching hook is tucked away between the locking region 26 and radial region 25 (and brace region 28) of the eye, prevents the fishing snap from snagging obstacles which traditionally plague fisherman. Testing has indicated that the present invention is 40% stronger than prior art snaps having the same size wire.

The foregoing detailed description of the invention is intended to be illustrative and non-limiting. Many changes and modifications are possible in light of the above teachings. Thus, it is understood that the invention may be practiced otherwise than as specifically described herein and still be within the scope of the appended claims.

What is claimed is:

1. A snap comprising:

a single length of tensile wire which is bent at a focal region so as to define a first end region and a second end region;

said first end region is comprised of a bracing arm, an eye and a plurality of loops at the extreme end portion of said first end region, said plurality of loops extending from said eye and looping around said bracing arm;

said second end is comprised of a lever arm and a latching hook located at the extreme end of said second end;

said eye is comprised of a contact brace region which integrally connects to both a radial portion of said eye and to said bracing arm, said radial portion of said eye being integrally connected to a locking region of said eye and said locking region integrally connecting to said plurality of loops which wrap around said bracing arm;

said latching hook is comprised of an upward region, which integrally and laterally connects to said lever arm, and by a downward locking region which integrally connects to said upward region at a contact point to form said latching hook, said downward locking region having an end point which is the extreme end point of said second end region;

when said snap is in an open position, said latching hook and said eye do not make contact, said upward region of said latching hook being directed toward said eye and said downward locking region of said latching hook and said end point being directed away from said eye;

when said snap is in a closed position, said contact point of said latching hook makes contact with said contact brace region of said eye with said downward locking region contacting said locking region of said eye and being substantially parallel thereto with said end point of said locking region curving and extending such that a frontal view of said snap would indicate that said end point of said latching hook is positioned between said locking region of said eye and said radial portion of said eye.

2. A snap according to claim 1, wherein:

when said snap is in the closed position and lying upon a flat surface with said locking region of said eye and said bracing arm contacting the flat surface said end point of said latching hook is positioned above said locking region of said eye and below said contact brace region of said eye.

3. A snap according to claim 2, wherein:

said plurality of loops is a first loop, a second loop and a third loop.

4. A snap according to claim 1, wherein:

when said snap is in a closed position and lying upon a flat surface with said lever arm contacting said flat surface and said eye not contacting said flat surface, said end point of said latching hook is positioned below said locking region of said eye and above said contact brace region of said eye.

5. A snap according to claim 1, wherein:

said plurality of loops is a first loop, a second loop and a third loop.

6. A snap comprising:

a single length of tensile wire which is bent at a focal region so as to define a first end region and a second end region;

said first end region is comprised of a bracing arm, an eye and a plurality of loops at the extreme end portion of said first end region, said plurality of loops extending from said eye and looping around said bracing arm, said plurality of loops comprising a first loop, a second loop and a third loop;

said second end is comprised of a lever arm and a latching hook located at the extreme end of said second end;

said eye is comprised of a contact brace region which integrally connects to both a radial portion of said eye and to said bracing arm, said radial portion of said eye being integrally connected to a locking region of said eye and said locking region integrally connecting to said plurality of loops which wrap around said bracing arm;

said latching hook is comprised of an upward region, which integrally and laterally connects to said lever arm, and by a downward locking region which integrally connects to said upward region at a contact point to form said latching hook, said downward locking region having an end point which is the extreme end point of said second end region;

when said snap is in an open position, said latching hook and said eye do not make contact, said upward region of said latching hook being directed toward said eye and said downward locking region of said latching hook and said end point being directed away from said eye;

when said snap is in a closed position, said contact point of said latching hook makes contact with said contact brace region of said eye with said downward locking region contacting said locking region of said eye and being substantially parallel thereto with said end point of said locking region curving and extending such that when said snap is lying upon a flat surface with said lever arm contacting said flat surface and said eye positioned above said flat surface, said end point of said latching hook is positioned below said locking region of said eye.

* * * * *